Sept. 15, 1964 C. E. MIESIAK 3,148,616

CODE DISK ATTACHING MEANS

Filed Oct. 24, 1961 4 Sheets-Sheet 1

INVENTOR.
CONRAD E. MIESIAK

BY Walter Patrnoko, Jr.
ATTORNEY

Sept. 15, 1964 C. E. MIESIAK 3,148,616

CODE DISK ATTACHING MEANS

Filed Oct. 24, 1961 4 Sheets-Sheet 3

United States Patent Office 3,148,616
Patented Sept. 15, 1964

3,148,616

CODE DISK ATTACHING MEANS

Conrad E. Miesiak, Detroit, Mich., assignor, by mesne assignments, to Holley Computer Products Company, Warren, Mich., a corporation of Michigan Filed Oct. 24, 1961, Ser. No. 147,370
2 Claims. (Cl. 101—110)

This invention relates to printers, and more particularly to the print drum and associated code disk mechanism disclosed in U.S. application Serial No. 138,157, entitled "High Speed Printer" and filed on September 14, 1961, in the names of Arvin D. McGregor and James M. Irvine, Jr.

The printer disclosed in the above referenced application includes an elongated cam driven directly by the main drive motor and a print drum driven at a constant speed related to the speed of the cam. This is so that the lobes of the cam will be in a position to impact any hammers addressed for printing at a time when the characters formed on the drum are disposed opposite the row of print hammers so that they can be impacted.

In other words, in this on-the-fly type of printer, the timing of (*a*) the rotation of the cam, (*b*) the addressing of the print hammers and (*c*) the rotation of the print drum must be coordinated so that the impact faces of the print hammers will impact the entire character as the character is moving past the printing station. This requires that the computer circuits and/or the electronic control circuits of the printer be supplied with suitable signals as to which row of characters on the drum is approaching the printing station so that it can be printed. For this purpose, the printer disclosed in the above referenced application includes a code disk assembly comprising a light source, a light refracting lens, a code disk having radially extending codes provided by concentric rings of alternating transparent and opaque areas and a row of light-sensitive photo-diodes extending radially with respect to the code disk. Different combinations of sensitized photo-diodes affected by appropriate combinations of light and dark areas along the radius of the code disk represent the various rows of identical characters formed on the print drum and accordingly generate signals representative of these different rows of characters.

Another feature of the printer disclosed in the above referenced application is that it provides means of interchanging print drums; that is, a print drum having one type of character may be removed so that a print drum having another type of character may be substituted. This is accomplished very quickly and easily by the printer operator. However, each print drum obviously requires its own related code disk. For this reason, it is likewise desirable that the code disks be easily and quickly interchanged by the operator of the printer.

It is apparent, however, that the angular position of the code disk when assembled in the printer must be precisely related to the angular position of the print drum. This is particularly true in view of the relatively high rotational speed of the print drum, and consequently the short times available for generating the signals indicating the character positions during printing.

In view of the above, an object of the invention is to provide a printer having character position indicating means that is easily removable and replaceable by the printer operator.

Another object of the invention is to provide means for mounting the character position indicating means on the print drum shaft in such a way that the code on the character position indicating means will at all times be properly and precisely positioned with respect to the characters on the print drum.

Another object of the invention is to provide, in a printer having interchangeable print drums and means to precisely position said print drums on the print drum drive shaft, matching interchangeable character position indicating means, said latter means being properly preadjusted at the factory so that there is no possibility of the printer operator assembling the same improperly.

These and other objects and advantages of the invention will become more apparent upon reference to the following specification and the attached drawings, wherein.

Figure 1:
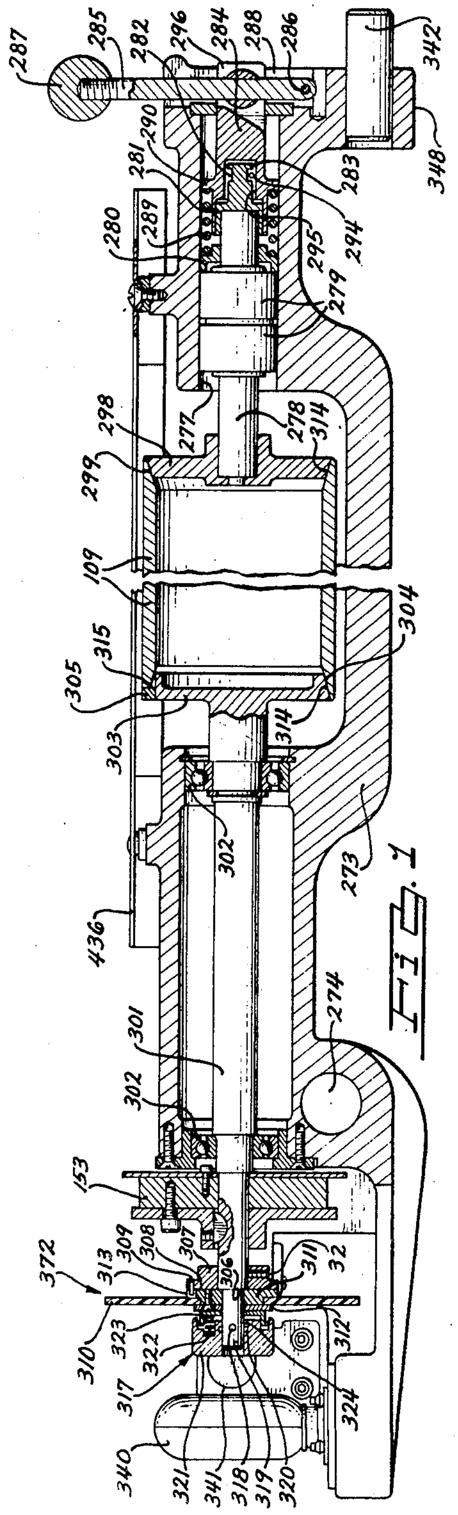
FIGURE 1 is a vertical cross-sectional view taken through the longitudinal axis of the print drum assembly of the printer disclosed in application Serial No. 138,157.
Figure 2:
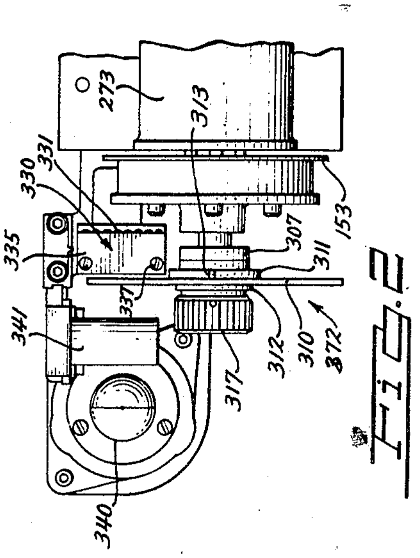
FIGURE 2 is a fragmentary top plan view of the left-hand portion of FIGURE 1.

The disclosure of the above referenced application Serial No. 138,157 is incorporated herein by reference to any extent deemed necessary to complete this disclosure, it being noted that FIGURES 1–4 contained herein are identical to FIGURES 21, 23, 24 and 25, respectively, of the referenced application.

Referring now to the drawings in greater detail, it will be seen that the mechanism for mounting and driving print drum 109 and the code disk assembly 372 are mounted on a suitably formed, relatively elongated casting or other support member 273, which may be pivotable about a point 274.

The pivoted end of the drum arm casting 273 is formed hollow to receive a longitudinally fixed shaft 301 mounted in a set of suitable hearings 302. The extreme outer end of shaft 301 is formed with a reduced portion so as to provide a shoulder 306. An annular abutment member 307 having an outer face 308 aligned with the shoulder 306 is secured to the shaft 301 by any suitable means such as a set screw, the abutment member having a locating pin 309 extending beyond its outer face. The shaft 301 is also fitted with the code disk 310 of the code disk assembly 372, the code disk comprising a disk of transparent material on which concentric rings of alternating opaque areas constituting a code are formed and having a central annular opening at which the annular mounting members 311 and 312 are secured by any means such as screws. The hubs or mounting members 311 and 312 are also formed with aligned central openings to enable the code disk to be mounted on the reduced end portion of the shaft 301, the mounting member 311 being placed in abutment member 307 so that the locating pin 309 is received in a locating slot 313 formed in the mounting member 311.

The end of the drum arm casting 273 opposite the pivoted end is formed with a longitudinal cylindrical bore 277 receiving a short shaft 278 mounted in a set of ordinary anti-friction bearings 279, the outer races of which are slidable in the bore 277, an annular spring seat 280 which is also slidable in the bore and an annular cap member 281 which is secured to the end of shaft 278 and formed with a groove 282 so as to terminate in a collar 283. A cylindrical locking member 284, also received in the bore 277 and formed so as to be slidable both within the bore and over cap member 281, has pivotally connected thereto a lever member 285. One end of lever 285 is pivotally fixed to the drum arm casting 273 on pivot 286 so that the lever can be moved outwardly by its upper end 287 from the vertical position to a horizontal position through a vertical slot 288 formed in the end of the drum arm casting 273. A helical compression spring 289 is positioned between the spring seat 280 and the annular shoulder 290 formed on the locking member 284. A pin 294 is fixed in the axial bore 295 of the locking member 284 in a manner so as to engage the collar 283 when the lever 285 is moved outwardly. The lever 285 is pivotally fixed intermediate the ends thereof in the slot 296 formed in the end of the locking member 284. A pin 342 is secured in the lower portion 348 of the drum arm casting 273. The structure referred to in this paragraph is described in greater detail in the above mentioned U.S. application Serial No. 138,157.

The print drum 109 is preferably a hollow cylinder made of any suitable material and having the rows of characters 161 suitably formed on the outer surface thereof. The inner ends of the drum are formed with conical surfaces 314 that match the conical surfaces 299 and 304 on the disks 298 and 303, respectively. The drum is placed in the printer by retracting the disk 298, applying the end of the drum having the groove or notch 315 formed therein over the disk 303 so that the locating lug 305 is received in the notch 315, lowering the other end of the drum and then forcing the lever 285 to the left in FIGURE 1 so that the disk 298 formed on the end of the shaft 278 enters and engages the drum under the force of the compressed spring 289. Removal of the drum is accomplished by the opposite procedure. A hinged cover 436 provides access to the drum 109. From the above, it is apparent that drums having only alpha, only numeric, alpha and numeric and different style characters may be quickly interchanged in the printer, provided, of course, that a suitable matching code disk 310 is employed with any particular drum.

The positioning lug 305 is, of course, employed so as to accurately position the drum 109 angularly with respect to the shaft 301. Likewise, the locating pin 309 accurately positions the code disk 310 angularly with respect to the shaft 301. The positions of the lug 305 and the locating pin 309 are such that the code disk 310 having radially extending codes of appropriately spaced opaque areas, when used in conjunction with a photodiode assembly, is able to identify a particular row of characters 161 on the print drum that is approaching the row of printing hammers 160.

The purpose of the code disk assembly 372 is to produce a signal identifying which row of characters formed on the drum 109 can next be printed; that is, this signal identifies the location of the characters on the drum while the printer is in operation. Since it is desirable to use the printer with different input codes for different drums, the code disk is made interchangeable by the use of a simple, spring-loaded, bayonet type quick-release mechanism 317 comprising a pin 318 extending from opposite sides of shaft portion 319 and adapted to be engaged in the annular groove 320 formed in a locking member 321. The locking member 321 is retained in the locked position by means of a compression spring 322 positioned between the locking member and annular plate member 323 movably fixed within the locking member and having a face engaging the outer abutment member 312. The locking member 321 is removed by slight pressure toward the code disk 310 and turning the same in either direction so that the ends of the pin 318 can pass through suitable openings formed in the flange 324 of the locking member, at which time the spring 322 snaps the locking member 321 outwardly so that it can be removed from the shaft portion 319. The code disk 310 can then be pulled off the shaft. The code disk 310 can be replaced or a new code disk can be assembled and locked on the shaft portion 319 by the reverse operation of the locking member 321. The code disk 310 and the drum 109 are driven together by means of a suitable motor driven belt 155 and pulley 153.

Figures 3, 4:
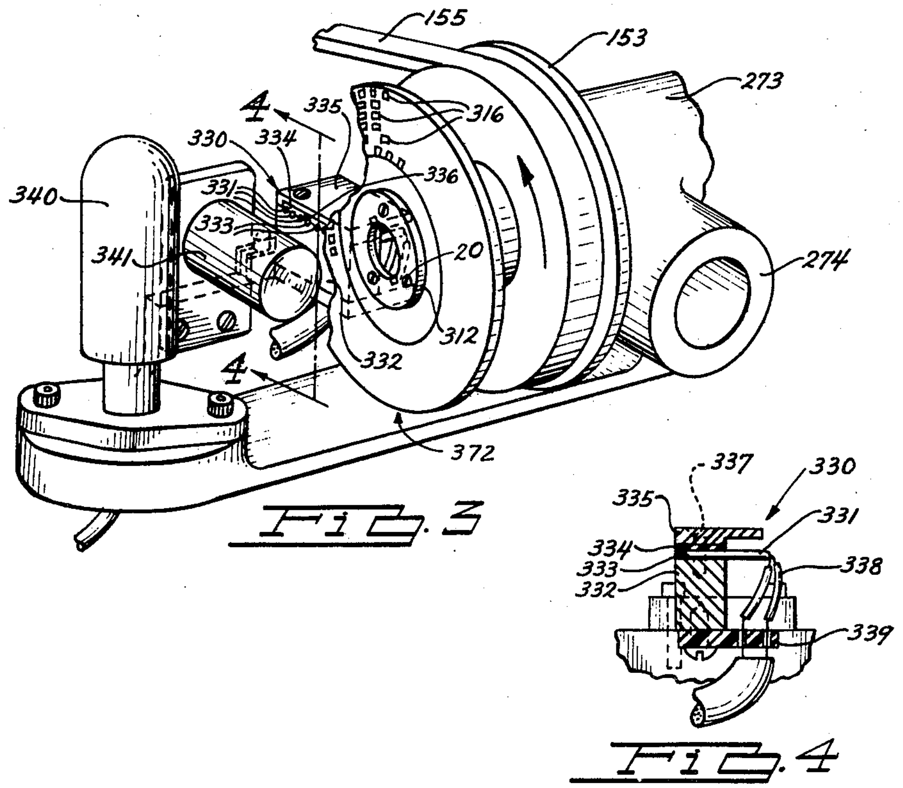
FIGURE 3 is an enlarged perspective view, with portions thereof cut away, of the structure of FIGURE 2 when looking in the direction of the arrow.
FIGURE 4 is a fragmentary cross-sectional view taken on the plane of line 4—4 of FIGURE 3 and looking in the direction of the arrows.
Figures 5, 6, 7:
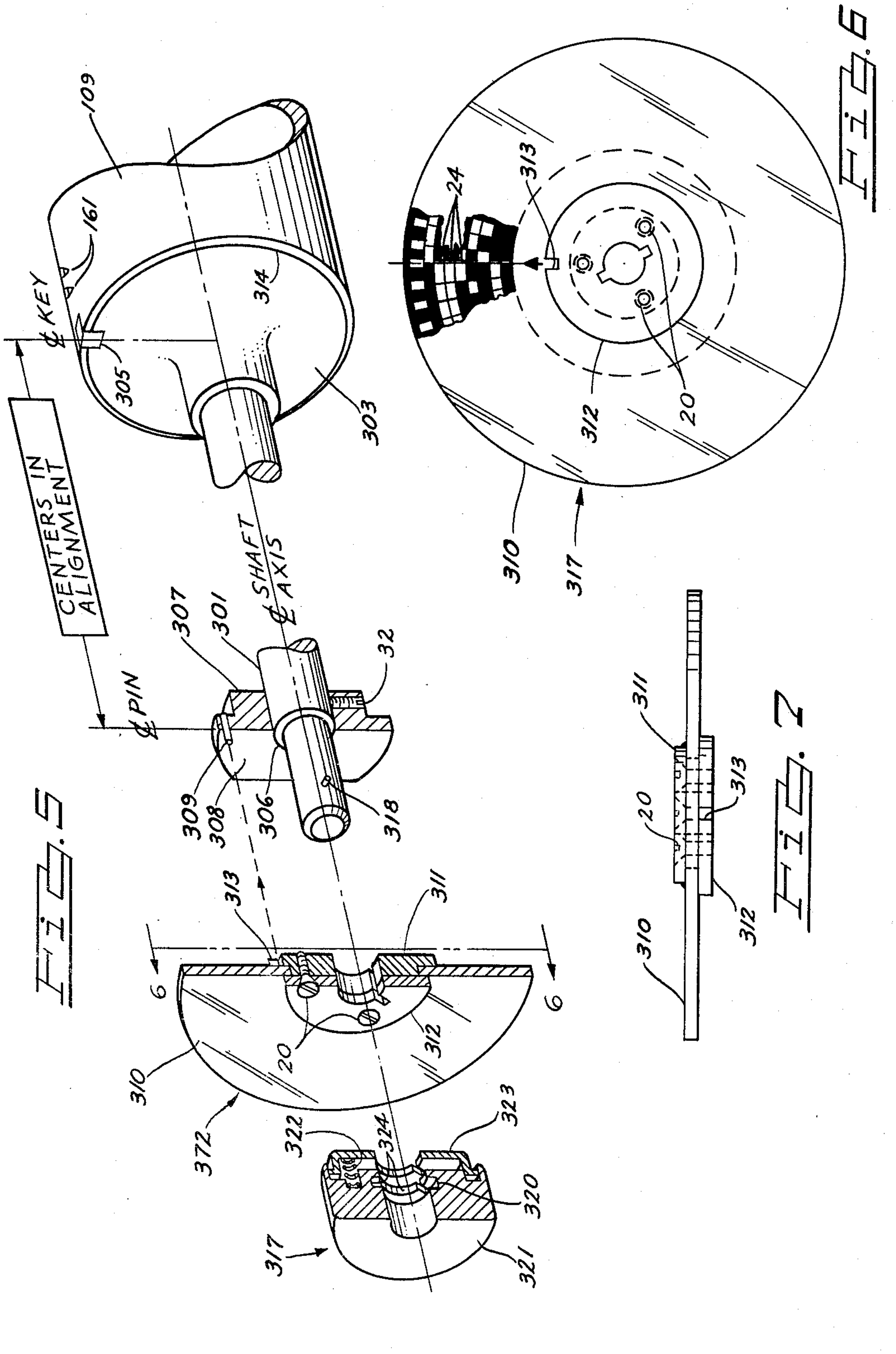
FIGURE 5 is an enlarged, exploded perspective view, with portions thereof cut away and in cross section, of the print drum, print drum shaft, and code disk elements shown in the left half portion of FIGURE 1.
FIGURE 6 is an elevational view of the code disk when viewed in the direction of the arrows of line 6—6 of FIGURE 5.
FIGURE 7 is an edge view of the code disk shown in FIGURE 6.

A photodiode assembly 330 such as that shown in FIGURES 3 and 4 is secured to the drum arm casting 273 in a manner so that the row of cylindrical photodiodes 331 is positioned radially with respect to the code disk 310 adjacent the inner side thereof. The photodiode assembly 330 comprises a lower mounting member 332 having a series of half cylindrical grooves 333 extending across the top face thereof in which the individual photodiodes 331 are laid, a rubber or other resilient pad 334 laid over the photodiodes 331 and a cover member 335 having a recess 336 receiving the pad 334 and secured to the lower member 332 by any means such as the screws 337 so as to compress the pad 334 and thus resiliently hold the photodiodes 331 in position with the light sensitive ends thereof facing the code disk 310. Each photodiode has suitable electrical connections 338 passing through the non-conducting spacer 339 secured to the under side of the lower member 332. The construction and purpose of an individual photodiode is well known in the art and need not be described here, there being one photodiode 331 for each one of the concentric code rings 316 on the code disk 310.

A lamp 340 is mounted on the end of the drum arm casting 273, and a cylindrical lens 341 made of any suitable plastic or other light refracting material is mounted between the lamp 340 and the code disk 310 to refract a line of light impinging on any photodiode that is not blocked by an opaque area on the code disk. Since the print drum and the code disk are properly aligned and locked in place, it is apparent that photodiodes will signal character position, it being understood that each different print drum requires its own properly formed code disk.

From the above description it will be seen that the drum 109 and the code disk 310 are driven together whenever power is supplied to the printer. The drum and its associated code disk are removable so as to be interchangeable with other drum and code disk sets and it is apparent that means are provided for insuring that the drum and code disk are positioned accurately with respect to the drum drive shaft without the operator himself making any adjustments. The drum is accurately positioned by reason of the lug 305 being received in a slot at the end of the drum. The lug itself is initially positioned at the factory so that the drum rotation is properly coordinated with the rotation of the cam. The abutment member 307 is rotatably adjustable on the shaft 301, and is secured in the properly adjusted position by the set screw 32. The pin 309 on the abutment member must be aligned exactly with the key positioning this drum, and this is also done at the factory by any suitable means such as an oscilloscope.

Figures 8, 9:
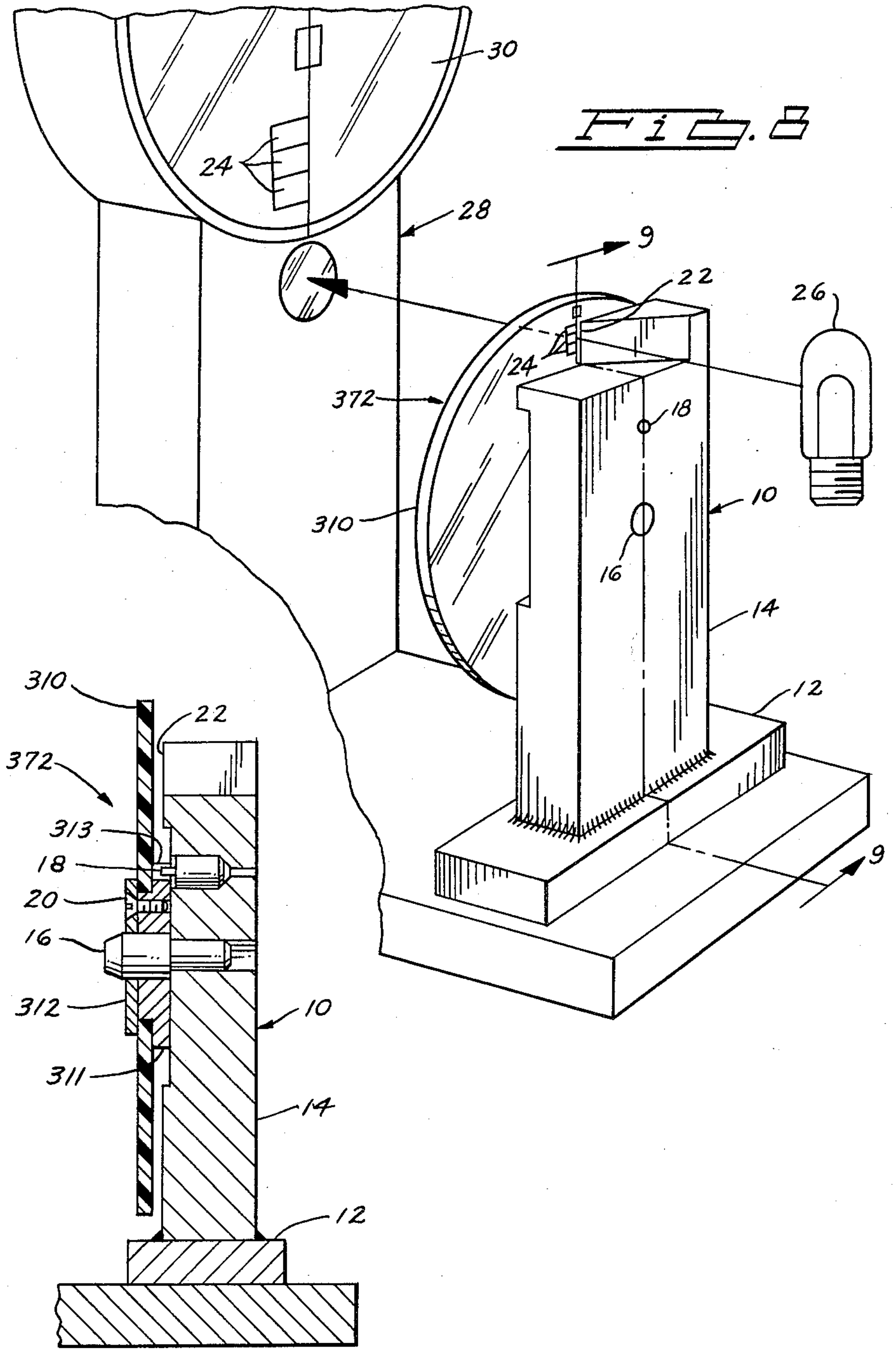
FIGURE 8 is a perspective schematic illustration of the method and apparatus employed to provide the proper angular relation between the code disk and its mounting hub.
FIGURE 9 is a cross-sectional view taken on the plane of line 9—9 of FIGURE 8 when looking in the direction of the arrows.

After the above adjustments have been made, the only thing that remains to be done is the adjustment of the code disk itself with respect to the slot 313 in the hub member 311 that receives the pin 309 when the code disk assembly is applied to the shaft 301. This is accomplished by means such as that shown in FIGURES 8 and 9. The fixture 10 employed for this purpose has a base 12 and a vertical portion 14 having a member 16 to simulate the shaft 301 and a second member 18, to simulate the pin 309. The code disk and hub assembly are assembled on the member 18 with the fastening screws 20 loosened so that the code disk 310 can be rotated with respect to the hub members 311 and 312. In the particular code disk shown, the proper angular adjustment of the disk with respect to the slot 313 is when the edge 22 of the fixture 10, which is in vertical alignment with the axes of the members 16 and 18, passes along the edge of the three adjacent clear area segments 24. In other words, the light source 26 is positioned so as to pass light through the clear areas 24 on code disk 310 and into the shadowgraph machine 28. The loose code disk 310 is then rotated with respect to the hubs 311 and 312, which cannot be moved due to the member 18 being positioned in the slot 313, until the code disk is precisely aligned on the magnification screen 30 as shown in FIGURE 8. The screws 20 are then tightened down and the code disk assembly is properly adjusted and ready for assembly on the printer when its associated print drum is assembled on the printer.

With the above previous factory adjustment of the print drum locating means and the code disk locating means, the operator can change print drums and coke disks quickly and accurately without having to make adjustments or using tools of any kind. Furthermore, when hub 312 is made the same diameter as hub 311, the operator cannot even assemble the code disk in the printer backwards because the pin 309 will prevent assembly of the mechanism 317.

While but one embodiment of the invention has been disclosed, is is apparent that modifications may be made within the scope of the appended claims.

What I claim as my invention is:

1. A print drum assembly for a printer, said assembly comprising axially aligned shafts, one of said shafts being a drive shaft, a print drum having rows of characters to be printed formed thereon, said print drum being mounted between said shafts in a manner to be removable, said second shaft being driven by said print drum, first means to assure that said print drum is always placed and retained in the same angular relation with respect to said drive shaft, and means mounted on the free end of said drive shaft so as to be rotatable with said drum for signaling the angular positions of said characters formed on said print drum, said signaling means comprising a code disk having means for always placing and retaining said code disk on said shaft in proper angular relation to the characters formed on said drum, said latter means including means formed on said shaft and aligned angularly with respect to said first means for positioning said print drum.

2. An improvement in a printer having a print drum with characters to be printed formed thereon, said drum being mounted on a shaft and having means associated therewith for providing precise angular mounting of said drum on said shaft, said improvement comprising means mounted on said shaft for continuously indicating the angular positions of the characters formed on said drum, said means comprising a code disk having a hub portion for mounting said disk on said shaft, said hub portion being angularly adjustable with respect to said code disk and having a locating notch formed therein so that said notch may be positioned in proper relation with the coding formed on said code disk prior to mounting on said shaft, and a code disk mounting member adjustably secured to said shaft, said code disk mounting member having a pin receivable in said notch formed in said hub member, said pin being aligned with said drum positioning means so that the coding on said code disk is in proper alignment with said characters formed on said print drum when said code disk is mounted on said shaft with said pin positioned in said notch.

References Cited in the file of this patent

UNITED STATES PATENTS

| | | |
|---|---|---|
| 1,762,992 | Kelly | June 10, 1930 |
| 2,117,220 | Sieg | May 10, 1938 |
| 2,687,088 | Hennessy et al. | Aug. 24, 1954 |
| 2,906,200 | Pfleger | Sept. 29, 1959 |
| 2,952,205 | Dunwoodie | Sept. 13, 1960 |
| 2,966,843 | Eckley | Jan. 3, 1961 |
| 3,001,469 | Davis et al. | Sept. 26, 1961 |
| 3,024,923 | Wasserman | Mar. 13, 1962 |